United States Patent [19]

Mikoshiba et al.

[11] Patent Number: 5,272,721
[45] Date of Patent: Dec. 21, 1993

[54] SPREAD SPECTRUM RECEIVING DEVICE

[76] Inventors: Nobuo Mikoshiba, 30-18, Yagiyama-Honcho 2-chome, Taihaku-ku, Sendai-shi, Miyagi-ken; Kazuo Tsubouchi, 30-38, Hitokita 2-chome, Taihaku-ku, Sendai-shi, Miyagi-ken, both of Japan

[21] Appl. No.: 961,060

[22] Filed: Oct. 14, 1992

Related U.S. Application Data

[63] Continuation of Ser. No. 653,494, Feb. 8, 1991, abandoned.

[30] Foreign Application Priority Data

Feb. 14, 1990 [JP] Japan .................................. 2-32782

[51] Int. Cl.⁵ .............................................. H04K 1/00
[52] U.S. Cl. ........................................ 375/1; 380/34; 370/18
[58] Field of Search ..................... 375/1, 38; 380/34; 320/18

[56] References Cited

U.S. PATENT DOCUMENTS

| | | |
|---|---|---|
| 4,045,796 | 8/1977 | Kline, Jr. . |
| 4,247,939 | 1/1981 | Stromswold et al. . |
| 4,279,018 | 7/1981 | Carson ........................... 375/1 X |
| 4,665,404 | 5/1987 | Christy et al. ............... 375/1 X |
| 4,862,178 | 8/1989 | Sturza et al. ................ 375/1 X |
| 4,862,478 | 8/1989 | McIntosh ........................ 375/1 |
| 4,862,479 | 8/1989 | Hamatsu et al. . |
| 4,926,440 | 5/1990 | Mikoshiba et al. ............. 375/1 |
| 5,038,363 | 8/1991 | Mitsutsuka .................. 380/34 X |
| 5,048,052 | 9/1991 | Hamatsu et al. ............... 375/1 |

FOREIGN PATENT DOCUMENTS

| | | |
|---|---|---|
| 2605819 | 4/1988 | France . |
| 1171751 | 11/1969 | United Kingdom . |
| 1600117 | 10/1981 | United Kingdom . |

Primary Examiner—Tod R. Swann
Attorney, Agent, or Firm—Flynn, Thiel, Boutell & Tanis

[57] ABSTRACT

A spread spectrum receiving device using a correlator in an IF stage of the receiving device is disclosed, which is so constructed that interference wave or disturbing wave is removed by subjecting the interference wave or the disturbing wave and a desired spread spectrum signal to a signal processing in a stage preceding or succeeding a correlator to take out the desired spread spectrum signal.

9 Claims, 14 Drawing Sheets

INFORMATION "1"

FIG. 7C
PRIOR ART

INFORMATION "0"

INFORMATION "1"

FIG. 8C
PRIOR ART

INFORMATION "0"

SPREAD SPECTRUM RECEIVING DEVICE

This application is a continuation of U.S. Ser. No. 07/653,494, filed Feb. 8, 1991 now abandoned.

FIELD OF THE INVENTION

The present invention relates to an improvement for removing disturbing wave in a spread spectrum receiving device, which receives various sorts of information by using spread spectrum.

BACKGROUND OF THE INVENTION

Heretofore various systems have been studied and developed for the communication system. The spread spectrum communication system is known as one of the systems having a high reliability.

By this spread spectrum communication system, on the transmitter side, information is transmitted by making primary modulated signals such as narrow band data of base band information, sound, etc. hop to a plurality of frequencies in a wide band at a high speed (FH system, Frequency Hopping), or by spreading spectrum to a wide band by using a high speed pseudo noise code (PN code) (DS system, Direct Sequence), or by spreading spectrum by combining them (FH/DS system), and on the receiver side the wide band signals are inversely spread to the original narrow band primary modulated signal by means of a correlator to reproduce the information signals. Recently attention is paid to this spread spectrum communication system as a communication system having an extremely high reliability from view points that it is resistant against external interference and noise, that it has further a high secrecy, etc.

One of the most important points of this spread spectrum communication system is the construction of the correlator on the receiver side. A correlator, which is believed to be the simplest and the most convenient and to have a high reliability at present in the wireless spread spectrum communication, is a device using surface acoustic wave (hereinbelow abbreviated to SAW).

As an SAW correlator there are known in general the correlator (tapped delay line type) and the convolver type. Here, although the correlator type has a simple construction and generally a high efficiency, it is influenced seriously by the temperature coefficient of the substrate. On the other hand, although the convolver type is hardly influenced by temperature variations, the efficiency thereof is generally low. However, in the case where the PN code described above is variable, the correlator type can not deal therewith, because the PN code is fixed. On the contrary, the sort of the PN code can be varied for the convolver type. Consequently, if the efficiency is at a practically usable level, a correlator of convolver type is much more easily used.

Further, in the spread spectrum system, by the DS system, since a high speed PN code is mixed with base band information by means of one mixer to transform it into a wide band information, this system can be very simply realized. However it is weak in disturbance or separation from other channels, or in the distance problem.

The signal spread directly by the PN code is subjected to a correlation processing with a reference signal by means of a correlator in the IF stage on the receiver side. When the PN code of the receiver side is in accordance with that of the transmitter side, a correlation peak is outputted from the correlator. However, when the ratio of the total power of the spread spectrum signal to the total power of the spectrum of disturbance, etc. is close to or greater than the process gain (gain of processing) of the convolver, even in the spread spectrum communication, communication errors are produced only by the DS system.

Figure 7A:
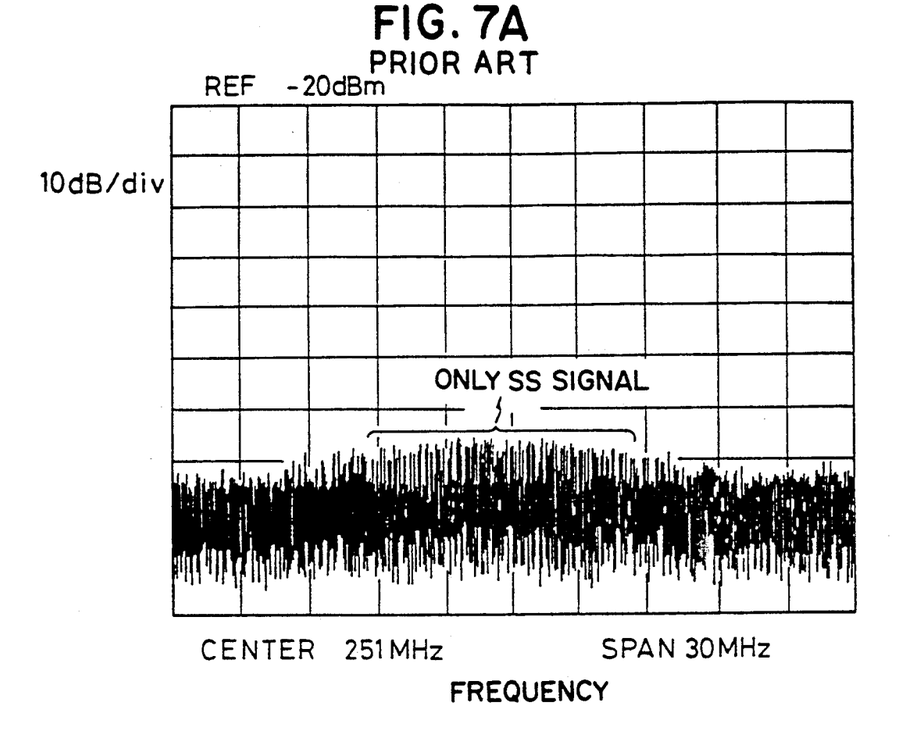
FIGS. 7A, 7B and 7C show waveforms of the correlation output according to a prior art system, when there are no disturbing waves.
Figure 7B:
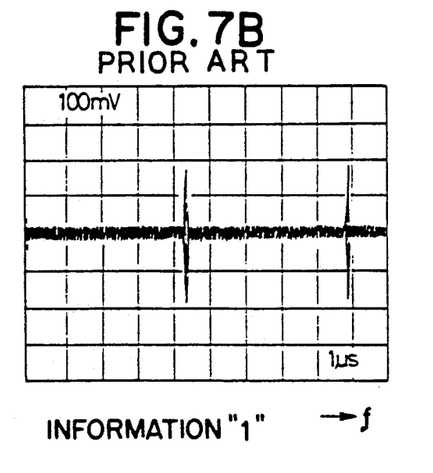
Figure 7C:
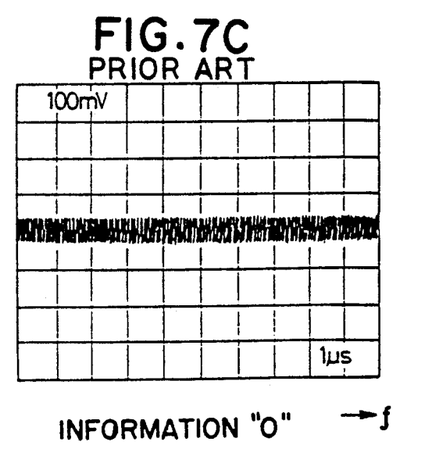
Figure 8A:
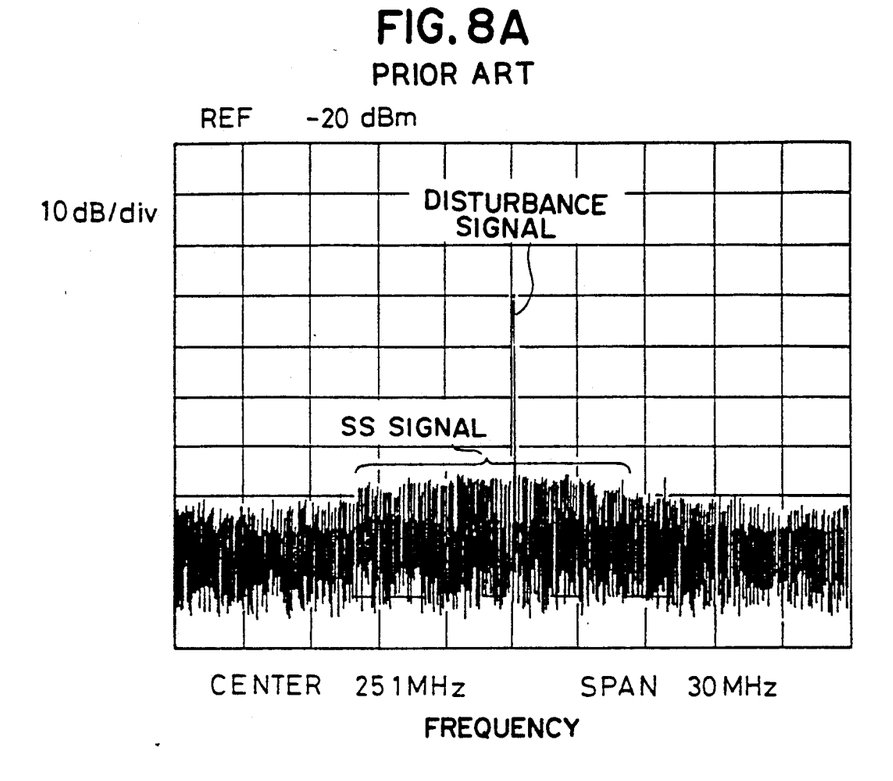
FIGS. 8A, 8B and 8C show worsening of the waveforms of the correlation output according to the prior art system, when there are disturbing waves.
Figure 8B:
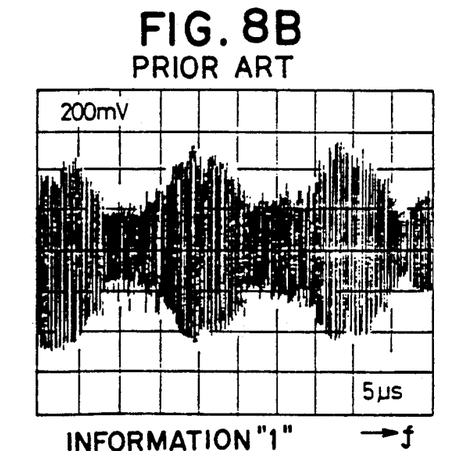
Figure 8C:
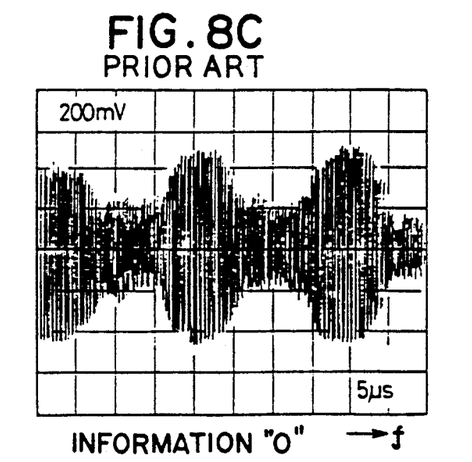

FIGS. 7A, 7B and 7C as well as FIGS. 8A, 8B and 8C illustrate problematical points of the prior art system. These figures show an example, in which the modulation method of the system is so determined that, an SAW convolver being used as the correlator by the DS system, when the base band information is "1", a convolution peak is outputted and when the base band information is "0", no convolution peak is outputted.

As indicated in FIGS. 7A, 7B and 7C, when there are no disturbance, etc., the convoution peak is correctly restored, depending on whether the information is "1" or "0". However, when the ratio of the total power of the spread spectrum signal to the total power of the spectrum of disturbance, etc. is close to or greater than the process gain of the convolver, it is not possible to judge whether the information is "1" or "0" and therefore an error is produced.

Consequently, it is necessary to remove this disturbing wave, etc. to improve the anti-disturbance property by some other signal processing.

As one of the efficient improving methods it is useful to remove disturbing spectrum indicated in FIG. 8A by means of a filter. However, since it can not be known previously where disturbed spectrum is produced, a programmable filter working in real time is necessary. However no satisfactory filter of this kind has been developed yet.

As described above, since it can not be judged previously, at which frequency position of the desired spectrum in the spread spectrum communication disturbance, etc. appear, it is desired to improve the worsening in the S/N ratio due to disturbance, at whichever frequency position the disturbing wave appears.

OBJECT OF THE INVENTION

Therefore the present invention has been done, taking such a point into account, and the object is thereof to remove disturbing wave, etc. by a simple method without necessitating any complicated programmable filter to secure communication of high reliability.

SUMMARY OF THE INVENTION

In order to achieve the above object, according to the present invention, in a spread spectrum communication device there is disposed means for removing excessive components generated by disturbance, etc. in an efficient and simple manner other than the desired correlation peak after having inversely spread the spread spectrum signal on the receiver side.

For this means a first invention is constructed by using a mixer having squaring characteristics. According to a second invention the reference signal for the correlator is FM-modulated and a third invention is so constructed that the center of the spectrum of the spread spectrum signal, which is weak against disturbance, is removed by means of a filter. Each of these constructions of the first to the third invention is efficient alone, but combinations thereof are more efficient.

By the construction of the first invention described above the disturbing wave components are removed by squaring the correlation output, on which the disturbing wave is superposed, and disposing band pass filters (B.P.F) in separated two groups. This is because, since the disturbing wave components are concentrated in the neighborhood of DC and in the neighborhood of a frequency twice as high as the frequency of the disturbing wave components in the frequency by squaring them, the disturbing wave components are removed by removing these frequency components in the neighborhood of DC and the frequency components twice as high as that of the disturbing wave components by means of the band pass filters (B.P.F) and in this way the desired spread spectrum signal component can be detected with a high S/N ratio.

Next, by the reference signal FM-modulating method, which is the construction of the second invention, the central frequency of the reference signal inputted in the correlator is always deviated in time from the frequency component of the disturbing frequency by disposing means for FM-modulating it and in this way it is possible to prevent that the disturbing wave components are outputted at the output of the correlator at the correlation processing.

Further, by the filter method, which is the construction of the third invention, although the neighborhood of the center is specifically weak against the disturbing wave, because electric power is concentrated at the neighborhood of the center, it is possible to obtain a correlation output having a high S/N ratio by removing previously the disturbing wave components entering the neighborhood of the center by means of a filter, before it is inputted in the correlator, in order to prevent it.

DETAILED DESCRIPTION

Hereinbelow some preferred embodiments of the present invention will be explained, referring to the drawings.

Figure 1:
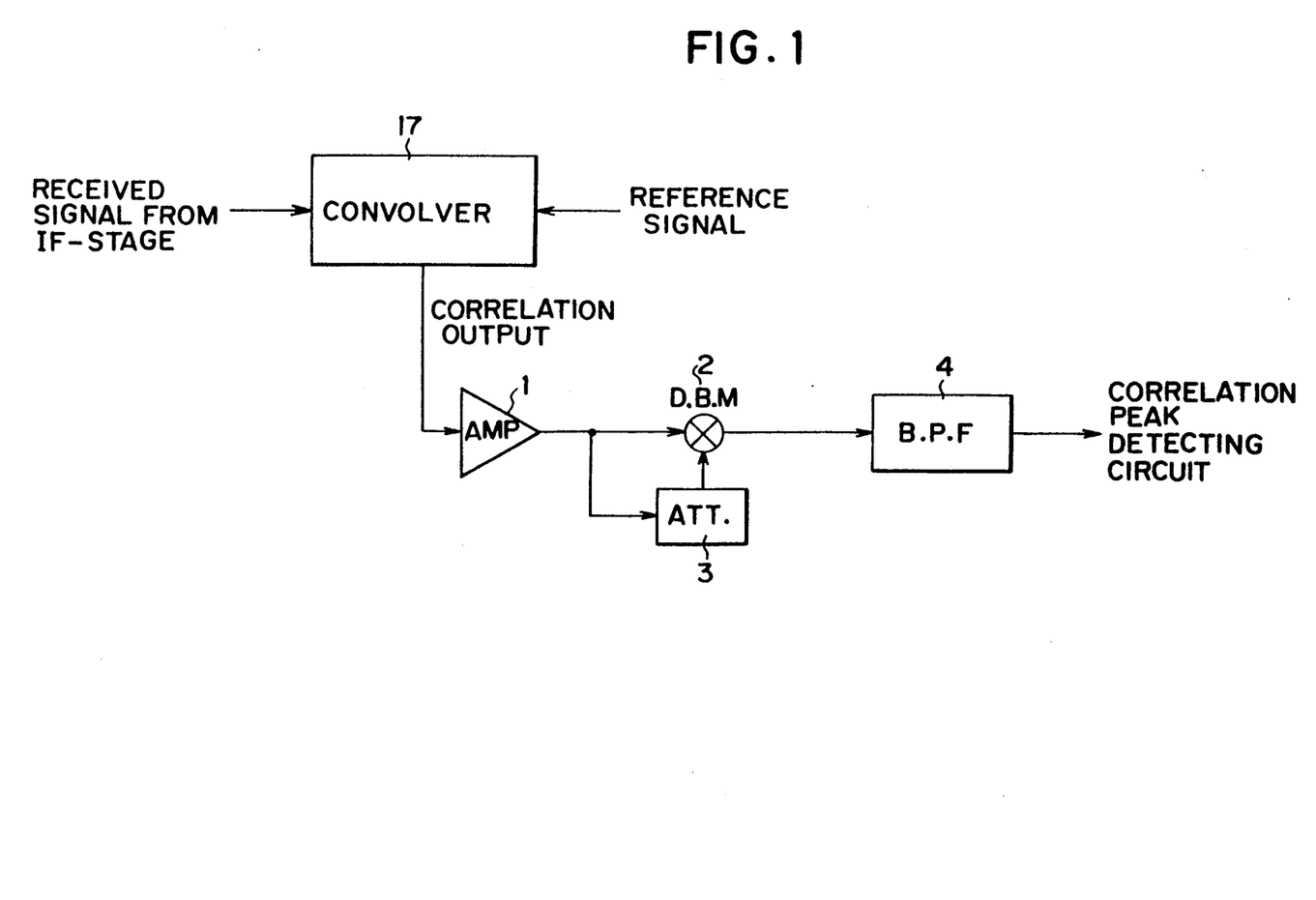
FIG. 1 is a block diagram of an embodiment of the disturbing wave removing signal processing circuit having a one-stage D.B.M. construction according to the present invention.

FIG. 1 shows the construction of an embodiment of the principal part (D.B.M. signal processing section) of a spread spectrum communication device having the construction using a double balance mixer (D.B.M.) serving as a mixer having squaring characteristics according to the present invention. In FIG. 1, reference numeral 1 is an amplifier; 2 is a double balance mixer; and 3 is an attenuator. A correlator output of a spread spectrum signal from a correlator 17, which is accompanied by disturbing waves is divided into 2 parts after having been amplified by the amplifier 1. One of them is led directly to D.B.M. 2 and the other is led to the other input of the D.B.M. 2 after having been made pass though the attenuator 3 for the purpose of the signal level regulation. Thereafter the output of the D.B.M. 2 is made pass through a band pass filter (B.P.F.) 4 in order to remove the disturbing waves and in this way a desired correlation output can be taken out with an excellent S/N ratio.

Figure 2A:
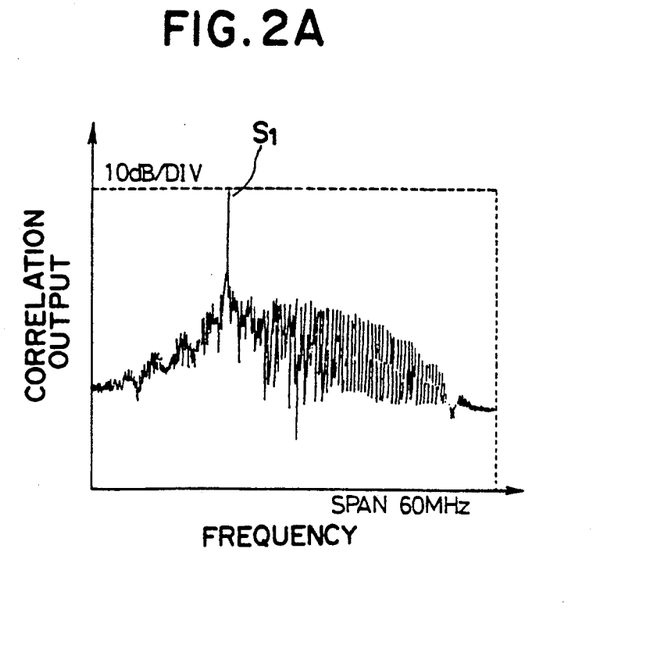
FIGS. 2A and 2B are schemes showing a correlation output frequency spectrum and a waveform in time before the signal processing indicated in FIG. 1.
Figure 2B:
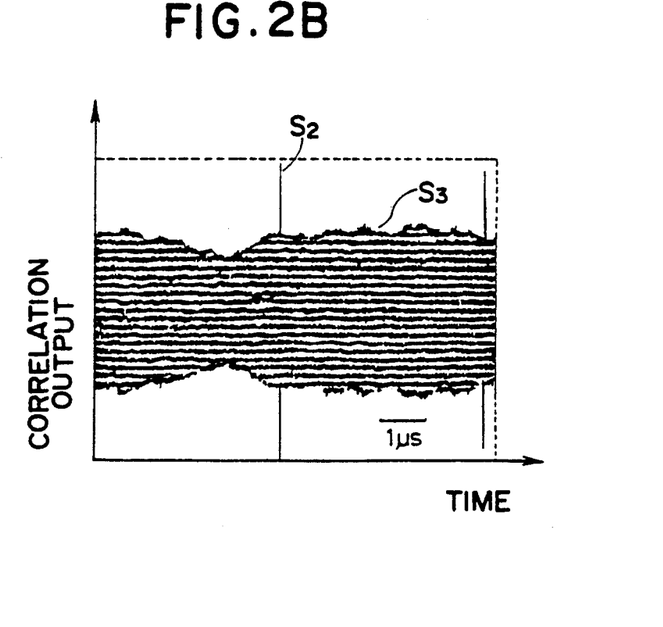
Figure 3A:
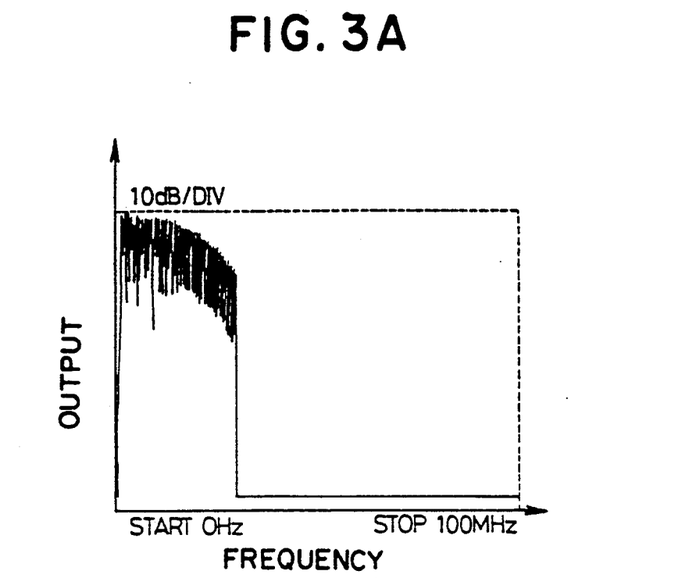
FIGS. 3A and 3B are schemes showing a correlation output frequency spectrum and a waveform in time after the signal processing indicated in FIG. 1.
Figure 3B:
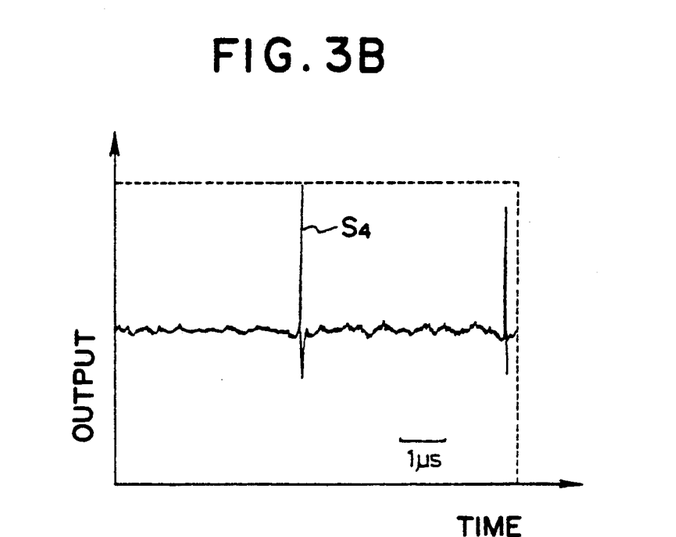

An example of the aspect of this D.B.M. signal processing is indicated in FIGS. 2A and 2B as well as in FIGS. 3A and 3B.

FIG. 2A shows a frequency spectrum of the output of the correlator on the receive side. A sharp peak due to a disturbing wave is found in a region indicated by ($S_1$) apart from a broad spectrum, which is the correlation output of the desired spread spectrum signal.

The waveform with respect to the time axis at this time is indicated in FIG. 2B. In this waveform ($S_2$) is the desired correlation peak and the disturbing wave is observed in the form of a great undulation ($S_3$) in the base line. As indicated above, since the correlation peak is superposed on the disturbing wave, the S/N ratio is low and an error is produced at restoring the base band information by the correlation peak detection.

However, if the signal processing circuit having the D.B.M. construction indicated in FIG. 1 is used together with a band pass filter having such characteristics as indicated in FIG. 3A, it is possible to obtain a waveform of the correlation peak ($S_4$) with respect to time having a high S/N ratio, in which the disturbing wave as indicated in FIG. 3B is suppressed. The S/N ratio was improved owing to the fact that the correlation output superposed on this disturbing wave was squared so that frequency components of the disturbing wave were shifted to the neighborhood of DC and the neighborhood of a frequency twice as high as that of the component of the original disturbing wave and it was possible to select only the frequency component of the correlation peak by means of the B.P.F. 4.

The embodiment described above is useful, in the case where there is only one disturbing wave. The embodiment described in FIG. 4 has a multi-stage construction, each of which consists of a D.B.M. and a B.P.F. so that not less than two disturbing waves can be removed, in the case where there exist more than one disturbing waves. In the figure, 5, 9 and 13 are amplifiers; 6, 10 and 14 are double balance mixers (D.B.M.); 7, 11 and 15 are attenuators; and 8, 12 and 16 are band pass filters (B.P.F.). In the case where there exist not less than two disturbing waves, when the correlation output of the correlator 17 including not less than two disturbing waves is squared, a frequency component (denoted by $\Delta f$ as a representative) of the frequency difference between different disturbing waves appears in the frequency band of the correlation peak (called correlation peak information band). By the present embodiment it is possible to remove the disturbing waves, whatever value the frequency component $\Delta f$ of the frequency difference between different disturbing waves has.

Figure 4:
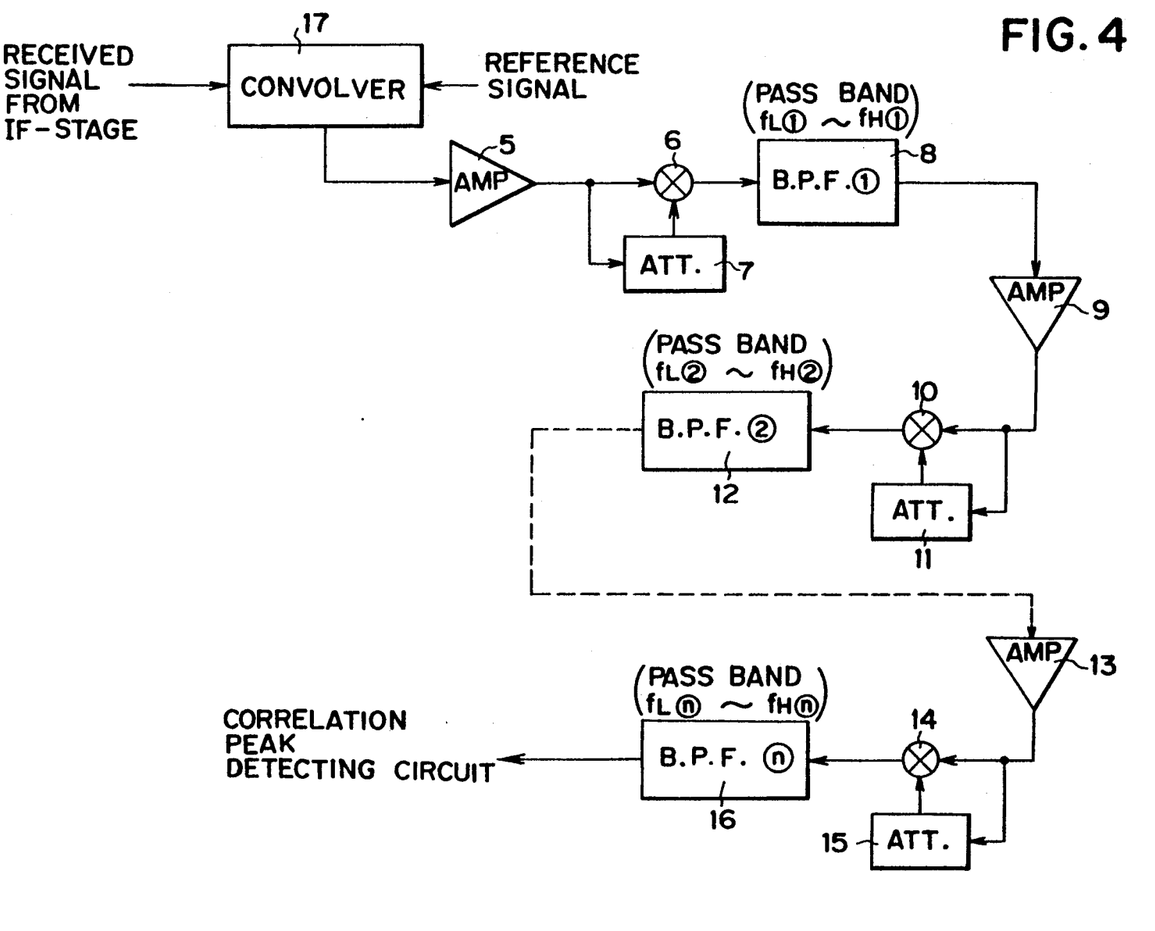
FIG. 4 is a block diagram of an embodiment of the disturbing wave removing signal processing circuit having a multi-stage D.B.M. construction according to the present invention.

For this reason, as indicated in FIG. 4, for the multi-stage construction consisting of D.B.M.s and B.P.F.s, the pass band of the B.P.F. in each stage is selected so as to satisfy the following relations;

$$f_{L\,1} > \frac{1}{2^{n-1}} \cdot f_{H\,n} \quad (1)$$

$$n \geq 2 \quad (2)$$

$$f_L(i) > 0 \quad (3)$$

$$i = 1, 2, \ldots n \quad (4)$$

where $f_L$ represents the low frequency side cutoff frequency of the B.P.F.; $f_H$ the high frequency side cutoff frequency; the n value in $f_L(n)$ or $f_H(n)$ number of the last stage, and i in $f_L(i)$ the position of each stage. The pass band for the B.P.F. in each of the stages is set so as to satisfy Equations (1) to (4). Further the level of the input signal to the D.B.M. in each of the stages is regulated by the attenuator 7, 11 or 15 so that the output thereof has squared characteristics with respect to the input.

At first, by the B.P.F. 8 in the first stage disturbing waves having frequency differences satisfying $$\Delta f \leq f_L(1) \quad (5)$$

on the low frequency side are removed. Disturbing waves having frequency differences satisfying $$\Delta f \leq f_L(i) \quad (6)$$

are removed by combinations of the D.B.M.s 10, 14 and the B.P.F.s 12, 16 in the second stage and the succeedings. This is because, when the pass bands are set as indicated by Equation (1), the components of the frequency differences between different disturbing waves satisfy $$2^{n-1} \times \Delta f > f_H(n) \quad (7)$$

and they are removed by the cutoff of the high frequency components by means of the B.P.F. 16 in the last stage. The condition expressed by Equation (3) is necessary for the noise cut of the DC component after the passage through the D.B.M. in each of the stages.

$f_H$ of the B.P.F. in each of the stages can have any value, if it makes the correlation peak information band pass through. However it is preferable that it is slightly greater than $f_H(n)$ the B.P.F. in the last stage. An example of the pass band of each B.P.F. in the present embodiment is indicated below. When an SAW convolver (input central frequency: 215 MHz, band width: 23 MHz) is used for the correlator in the receiver, the output of the correlator having a central frequency of 430 MHz and a band width of 46 MHz is issued in the IF stage of the receiver. In the succeeding stage of the output of this correlator a multi-stage construction signal processing circuit was made, which was composed of $n = 3$ stages, each of which consisted of a D.B.M. and a B.P.F. so that $f_H(3) = 30$ MHz and $f_L(1) = 8$ MHz.

By constructing the receiving device in this way it was possible to remove the disturbing wave, whatever value the frequency component $\Delta f$ of the frequency difference between different disturbing waves has. Further, at this time, the difference between the case where only the correlator is used and the case where the signal processing circuit according to the present embodiment is located in the stage succeeding the correlator consists in that, representing the ratio of the total power of the desired spread spectrum signal to the total power of disturbance, etc. entering the spread spectrum communication band by D/U, the anti-disturbance property for obtaining a same error rate is improved relatively by more than about 15 dB in the D/U ratio by the circuit according to the present embodiment.

The numerical values described above are only an example. In short, it is sufficient that the signal processing circuit is composed of multiple stages, each of which consists of a D.B.M. and a B.P.F. so that an arbitrary number of stages satisfy Equations (1) to (4). Further, instead of the D.B.M., any mixer may be used, if it has squaring characteristics. For the B.P.F. any filter may be used, if it satisfies the conditions expressed by Equations (1) to (4) described above.

Figure 5:
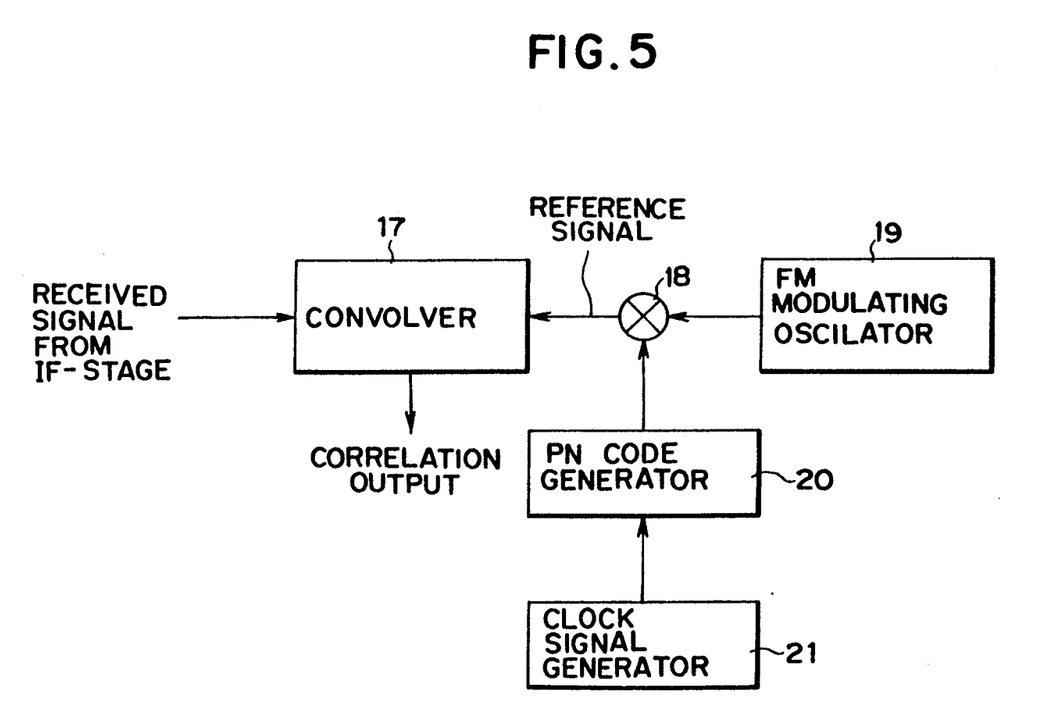
FIG. 5 is a block diagram of an embodiment of the disturbing wave removing signal processing circuit by the correlator reference signal FM-modulating method according to the present invention.

Next, the embodiment indicated in FIG. 5 is an example corresponding to the second invention, which is so constructed that the reference signal for the correlator is FM-modulated. In the figure, reference numeral 17 is a convolver; 18 is a mixer; 19 is an FM-modulating oscillator; 20 is a PN code generator; and 21 is a clock signal generator. Although the received signal includes disturbing wave in the IF stage in the receiver, it is inputted in the SAW convolver 17 serving as the correlator as the transmitted signal.

On the other hand, a PN code, which is inverted in time with respect to the PN code of the received signal, is generated by the PN code generator 20 by giving a clock signal from the clock signal generator 21 to the PN code generator 21. At this time, an FM-modulated carrier is generated by using the FM-modulating oscillator 19 and multiplied by the PN code described above by the mixer 18 to output the reference signal, this reference signal being inputted in the convolver 17. Concerning the frequency shift of the FM-modulation, in the case of the SAW convolver 17, an effect can be obtained also if it is shifted arbitrarily up to the inverse of the time: $\tau_g$, during which the SAW is propagated over the convolution electrode.

An example of concrete numerical values being given, in the case where the central frequency of the convolver is 215 MHz and the delay time of the convolution gate is 9 $\mu$sec, when the frequency shift of the reference signal (on one side from the central frequency) is 50 kHz and the modulated wave representing the speed of the shift is 20 kHz, the anti-disturbance property is improved by more than about 10 dB with respect to the case where the reference signal is not FM-modulated.

The values described above represent only one example. In short, the second invention is characterized in that the reference signal is FM-modulated so that the central frequency thereof is not in accordance with frequency components of the disturbing wave and an effect can be obtained, if the frequency shift is smaller than $1/\tau g$. Further the FM modulation method may be any method and the effect can be obtained by any method, if the frequency shift can be set within $1/\tau g$ and a modulated wave is applied thereto.

Figure 6:
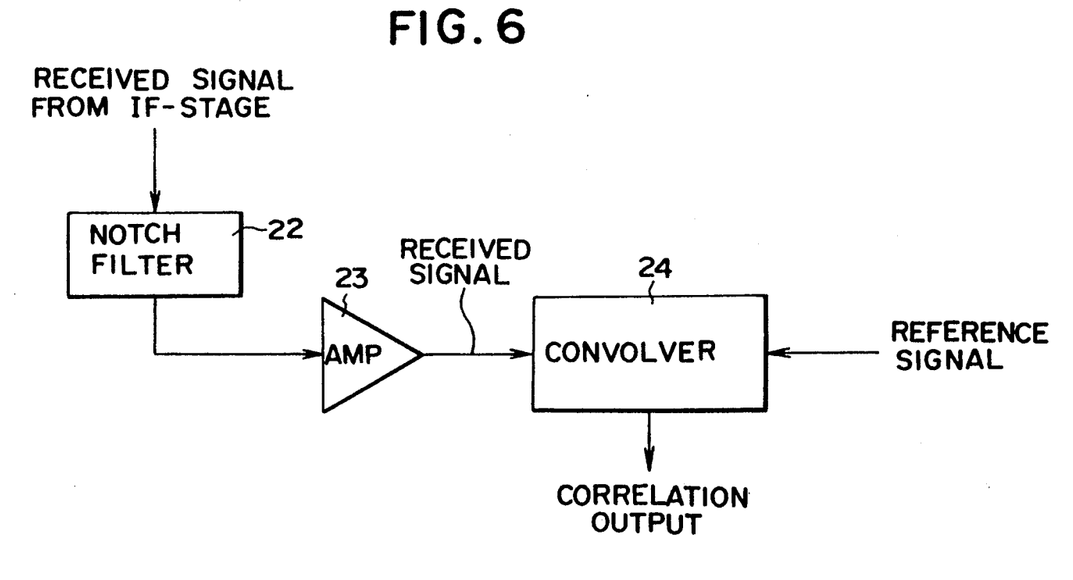
FIG. 6 is a block diagram of an embodiment of the disturbing wave removing signal processing circuit by the notch filter method according to the present invention.

Now the embodiment indicated in FIG. 6 corresponds to the third invention, in which the center of the spectrum of the spread spectrum signal particularly weak against the disturbance is removed by means of a fixed notch filter. In the figure, 22 is the fixed notch filter; 23 is an amplifier; and 24 is an SAW convolver. Although the DS system, which is a spread spectrum system, is a simple system, it has a drawback that electric power is concentrated in the neighborhood of the center in the spectrum of the spread spectrum signal. Therefore, if the disturbing wave was at the center, it was weak in the anti-disturbance property by the charac-teristics of the convolver.

In the present embodiment, only the neighborhood of the spread spectrum of the received signal in the IF stage is taken out previously and used as the received signal input to the convolver after having been made pass through the amplifier. In this way, it was possi-ble to remove the drawback that it is weak particularly against the disturbing wave appearing in the neighborhood of the center of the frequency spectrum of the spread spectrum signal, i.e. the drawback described above.

An example of concrete numerical values used in the present embodiment being given, in the case of the DS system using a PN code of 127 chips, where the code rate is 14 MHz, when a convolver, for which the central frequency is 215 MHz and the convolution gate delay time is 9 $\mu$sec, is used, a notch filter, in which the center is 215 MHz; a 3 dB band is about 1.5 MHz wide; and the attenuation at the center is about 38 dB, is used. The frequency spectrum of the spread spectrum signal is about 28 MHz and even if a part corresponding to about 1.5 MHz is subtracted therefrom by means of the notch filter, the worsening of the correlation peak is slight, it is possible to improve the weak part of the central portion against the disturbing wave with a high efficiency.

The numerical values described above is only an example. In short, it is a useful method for improving the anti-disturbance property to attenuate the central portion of the frequency spectrum of the spread spectrum signal by inserting the notch filter and either one of an LCR circuit, a strip line type, a digital filter, and an SAW filter can be used usefully for the notch filter.

The anti-disturbance property can be remarkably improved with respect to that obtained by using the different systems separately, when two of the D.B.M. construction system used in the embodiment indicated in FIG. 4, the system indicated in FIG. 5, in which the reference signal for the correlator is FM-modulated, and the notch filter system used in the embodiment indicated in FIG. 6 or all of the three systems are combined to be used.

Figure 9:
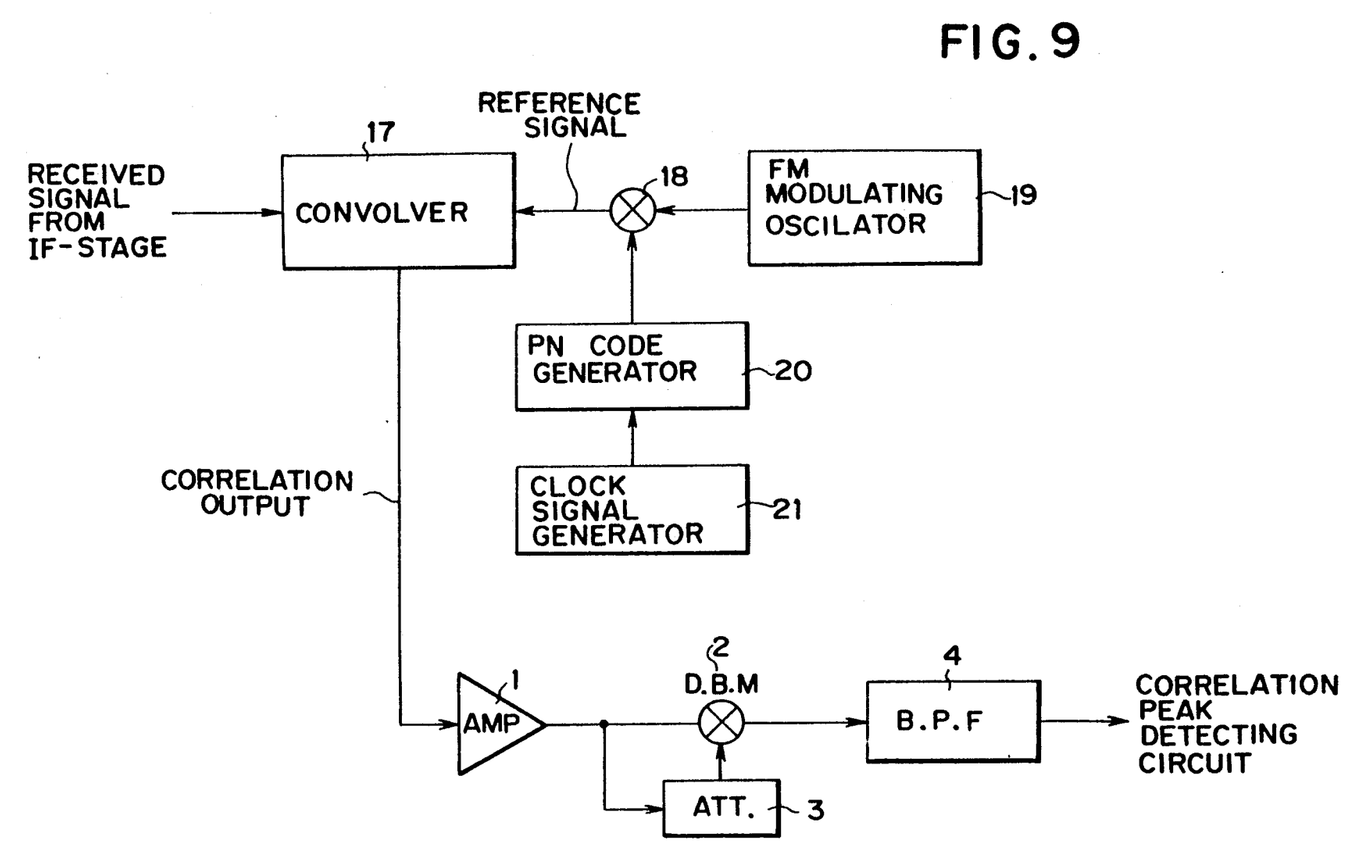
FIG. 9 is a block diagram showing a modified example, which is a combination of the embodiment indicated in FIG. 5 with that indicated in FIG. 1.

FIG. 9 illustrates a combination of the embodiment indicated in FIG. 5 with that indicated in FIG. 1, in which the correlation output from a convolver 17 is given to a D.B.M. 2 and an attenuator 3 through an amplifier 1.

Figure 10:
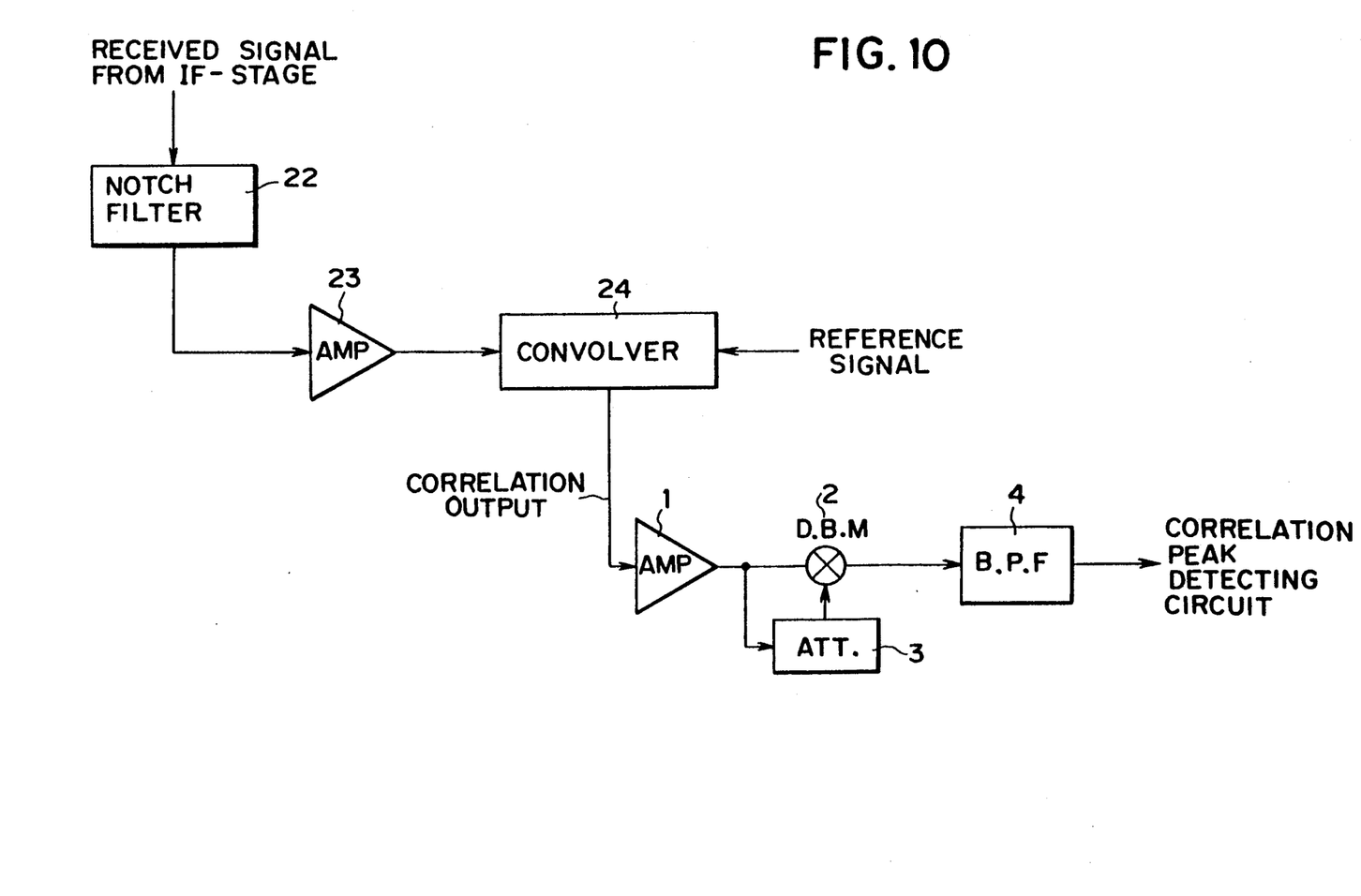
FIG. 10 is a block diagram showing a modified example, which is a combination of the embodiment indicated in FIG. 6 with that indicated in FIG. 1.

FIG. 10 illustrates a combination of the embodiment indicted in FIG. 6 with that indicated in FIG. 1, in which the correlation output from a convolver 24 is given to the D.B.M. 2 and the attenuator 3 through the amplifier 1.

Figure 11:
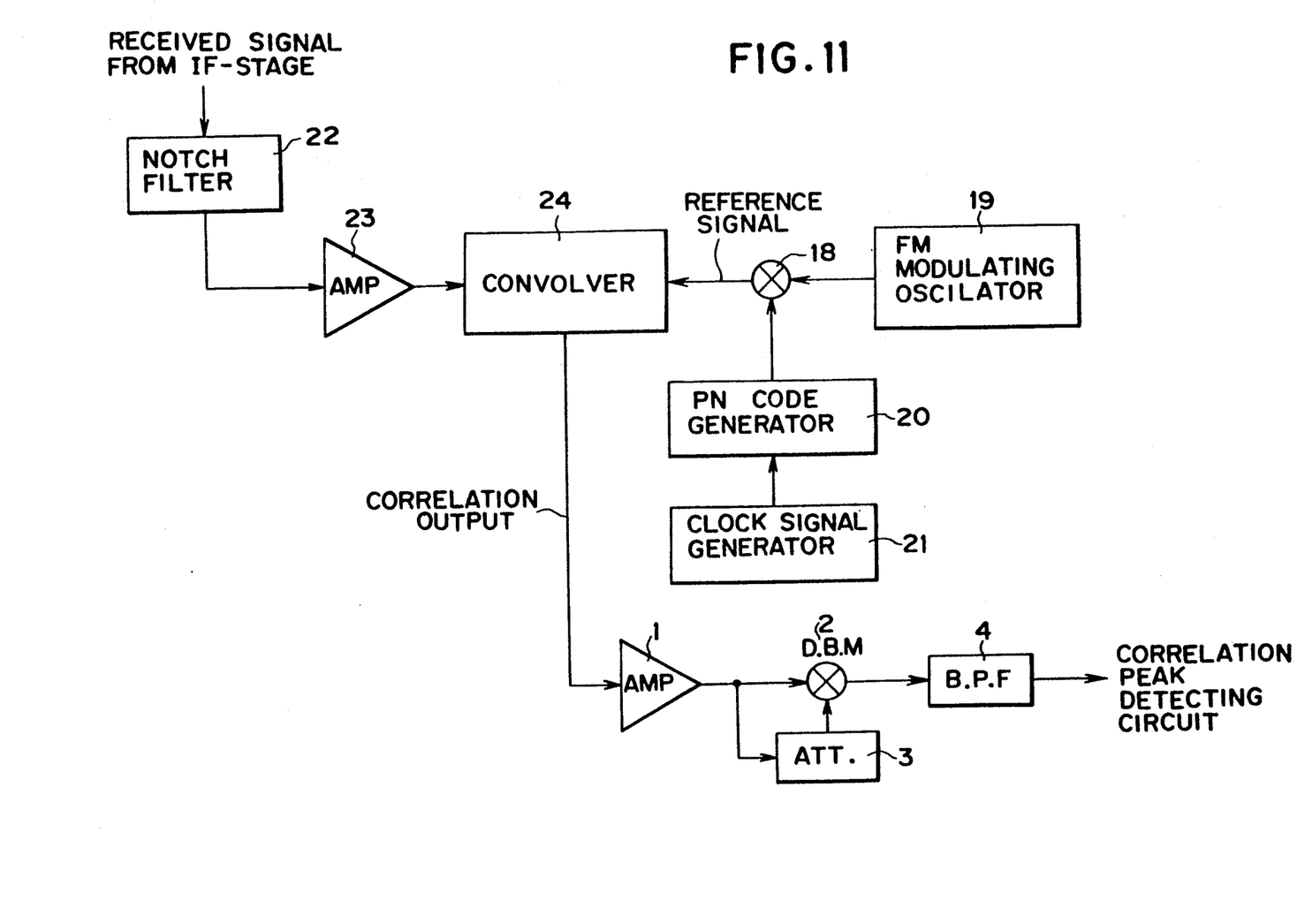
FIG. 11 is a block diagram showing a modified example, which is a combination of the embodiments indicated in FIGS. 1, 5 and 6.

FIG. 11 illustrates a combination of the embodiments indicated in FIGS. 1, 5 and 6.

Figure 12:
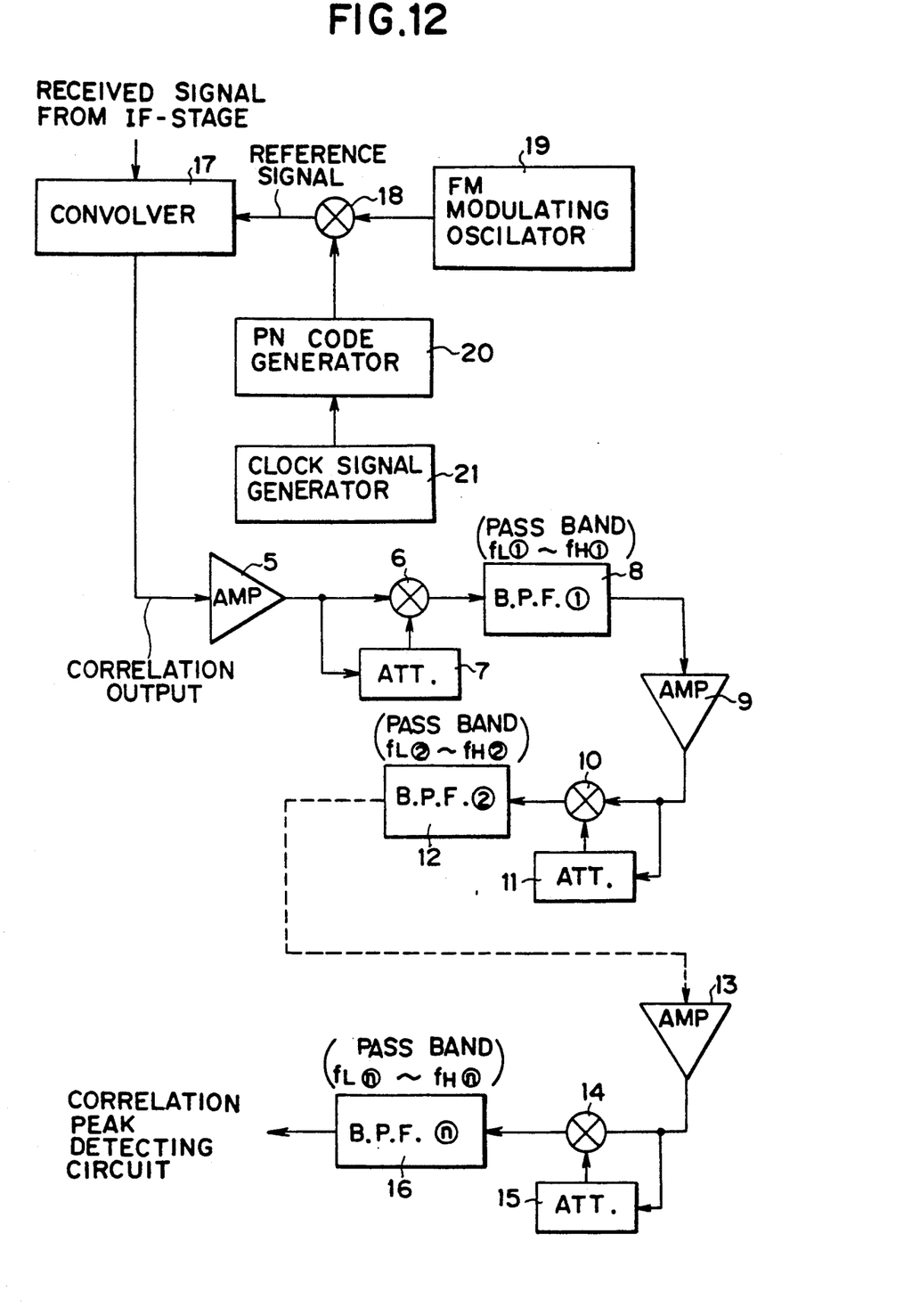
FIG. 12 is a block diagram showing a modified example, which is a combination of the embodiment indicated in FIG. 5 with that indicated in FIG. 4.

FIG. 12 illustrates a combination of the embodiment indicated in FIG. 5 with that indicated in FIG. 4.

Figure 13:
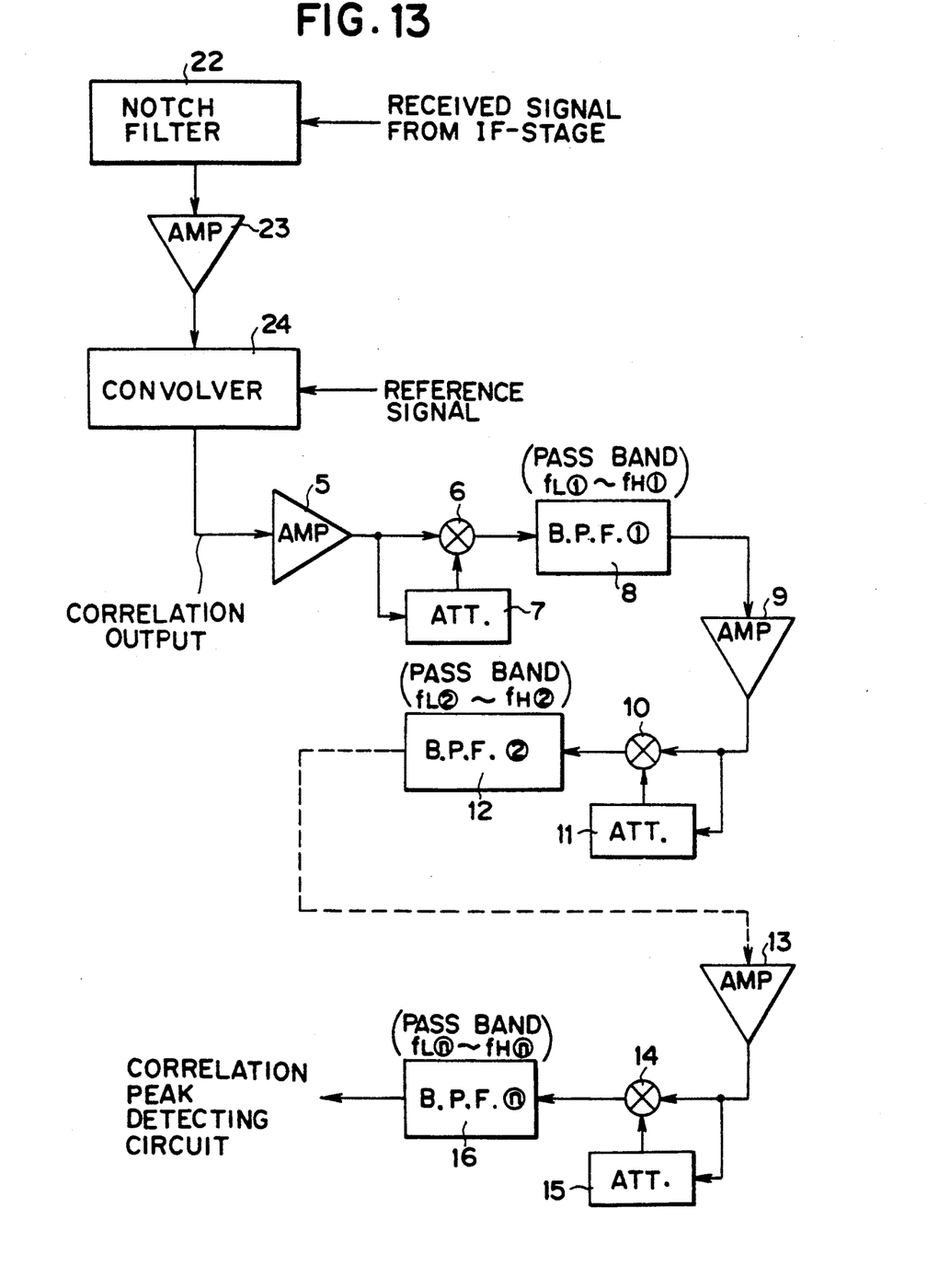
FIG. 13 is a block diagram showing a modified example, which is a combination of the embodiment indicated in FIG. 6 with that indicated in FIG. 4.

FIG. 13 illustrates a combination of the embodiment indicated in FIG. 6 with that indicated in FIG. 4.

Figure 14:
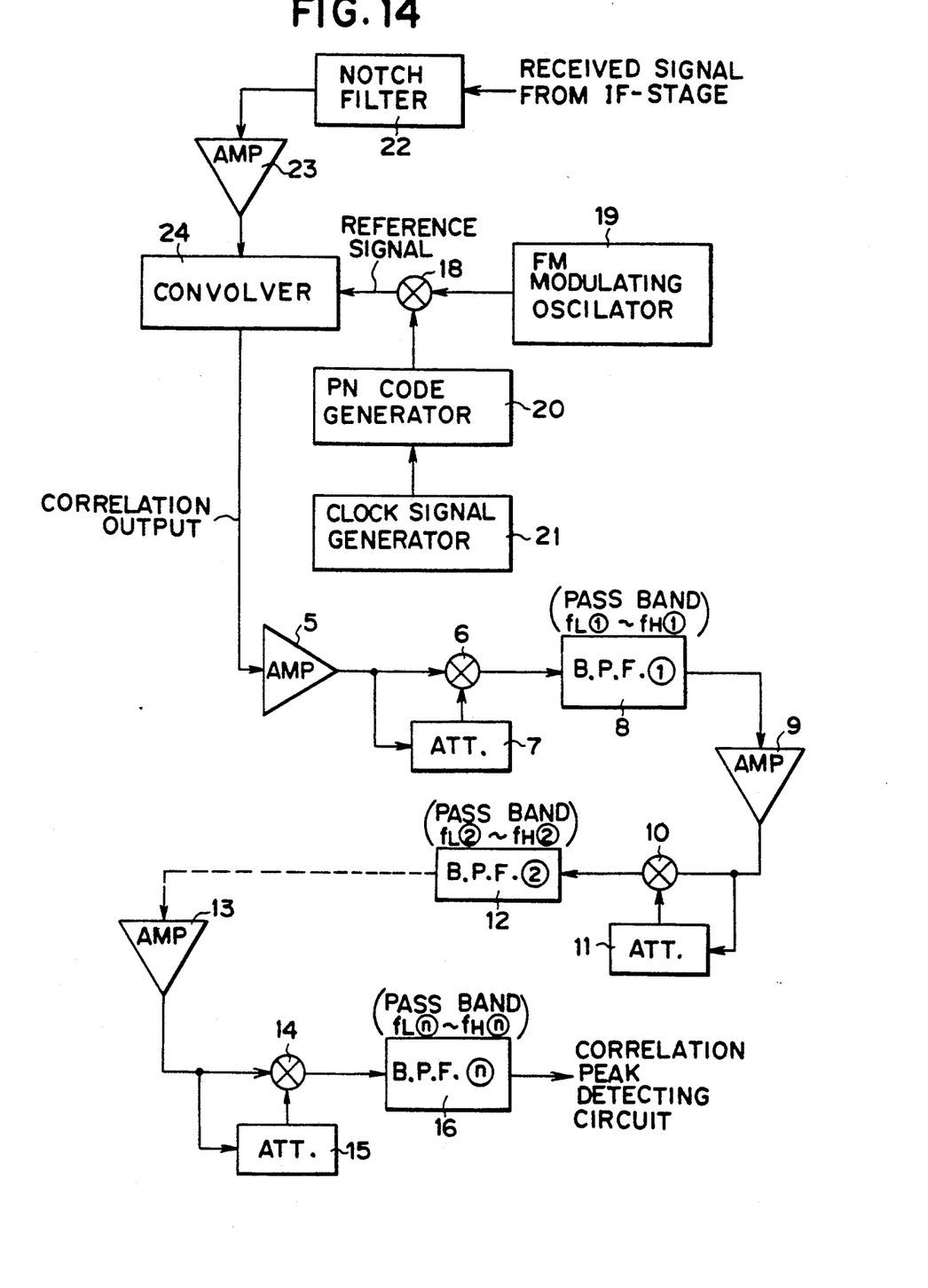
FIG. 14 is a block diagram showing a modified example, which is a combination of the embodiments indicated in FIGS. 5, 6 and 4.

FIG. 14 illustrates a combination of the embodiments indicated in FIGS. 5, 6 and 4.

As explained above, according to the present invention, in a spread spectrum communication device it is possible to remove disturbing wave with a high efficiency by applying a simple method to the receiver and communication of high reliability is made possible.

In particular, in the case where communication is effected, using weak electromagnetic wave, this effect of removing the disturbance is remarkable in practice.

Further the disturbing wave removing system according to the present invention can be applied widely, as a disturbing wave removing system, not only to the spread spectrum communication but also when an information band having a wide frequency band is subjected to a narrow band disturbing wave.

What is claimed is:

1. A spread spectrum receiving device comprising:
   a convolver effecting correlation between a received signal and a reference signal to obtain a spikelike correlation output when said correlation is effected;
   at least one mixer having squaring characteristics, disposed in a stage succeeding said convolver; and
   at least one band pass filter passing only a target signal component in the output of said mixer and rejecting a disturbance signal component in the output of said mixer, disposed in a stage succeeding said mixer.

2. A spread spectrum receiving device comprising:
   a correlator for effecting correlation between a received signal and a reference signal to obtain a correlation output;
   at least one mixer having squaring characteristics, disposed in a stage succeeding said correlator; and
   at least one band pass filter passing only a predetermined frequency band component in the output of said mixer, disposed in a stage succeeding said mixer;
   wherein circuits, each of which includes a respective said mixer and a respective said band pass filter connected in series with each other, are connected in series in a plurality of stages succeeding said correlator.

3. A spread spectrum receiving device comprising:
   a correlator for effecting correlation between a received signal and a reference signal to obtain a correlation output;
   at least one mixer having squaring characteristics, disposed in a stage succeeding said correlator;
   at least one band pass filter passing only a predetermined frequency band component in the output of said mixer, disposed in a stage succeeding said mixer; and
an attenuator;
wherein said mixer is a double balance mixer having first and second inputs, said correlation output being applied to said first input of said mixer and to an input of said attenuator, said attenuator having an output coupled to said second input of said mixer.

4. A spread spectrum receiving device comprising:
a PN code generator responsive to a clock signal for generating a first PN code which is inverted in time with respect to a second PN code of a received signal;
an FM-modulating oscillator for generating an FM-modulated carrier;
a mixer outputting a reference signal obtained by multiplying said carrier by the first PN code outputted by said PN code generator;
a correlator for effecting correlation between said received signal and said reference signal to obtain a correlation output;
at least one mixer having squaring characteristics, disposed in a stage succeeding said correlator; and
at least one band pass filter passing only a predetermined frequency band component in the output of said mixer, disposed in a stage succeeding said mixer.

5. A spread spectrum receiving device comprising:
a notch filter disposed in an IF stage of said receiving device for extracting a predetermined band component in a spectrum of a received signal coming from said IF stage;
a convolver effecting correlation between an output of said notch filter and a reference signal to obtain a spikelike correlation output when said correlation is formed;
at least one mixer having squaring characteristics, disposed in a stage succeeding said convolver; and
at least one band pass filter passing only a target signal component in the output of said mixer and rejecting a disturbance signal component in the output of said mixer, disposed in a stage succeeding said mixer.

6. A spread spectrum receiving device comprising:
a notch filter disposed in an IF stage of said receiving device for extracting a predetermined band component in the spectrum of a received signal coming from said IF stage;
at least one mixer having squaring characteristics, disposed in a stage succeeding said correlator;
at least one band pass filter passing only a predetermined frequency band component in the output of said mixer, disposed in a stage succeeding said mixer;
a PN code generator responsive to a clock signal for generating a first PN code which is inverted in time with respect to a second PN code of a received signal;
an FM-modulating oscillator for generating an FM-modulated carrier;
a mixer outputting a reference signal obtained by multiplying said carrier by the first PN code outputted by said PN code generator; and
a correlator forming correlation between an output of said notch filter and said reference signal to obtain a correlation output.

7. A spread spectrum receiving device according to claim 6, wherein circuits, each of which includes a respective said mixer having squaring characteristics and a respective said band pass filter connected in series, are connected in a plurality of stages.

8. A spread spectrum receiving device comprising:
a notch filter disposed in an IF stage of said receiving device for extracting a predetermined band component in a spectrum of a received signal coming from said IF stage;
a correlator for effecting correlation between an output of said notch filter and a reference signal to obtain a correlation output;
at least one mixer having squaring characteristics, disposed in a stage succeeding said correlator; and
at least one band pass filter passing only a predetermined frequency band component in the output of said mixer, disposed in a stage succeeding said mixer;
wherein circuits, each of which includes a respective said mixer and a respective said band pass filter connected in series, are connected in a plurality of stages.

9. A spread spectrum receiving device according to claim 8, wherein said predetermined band is a band which includes the center of the spectrum.

* * * * *